United States Patent [19]

Oh-ishi et al.

[11] Patent Number: 5,053,823
[45] Date of Patent: Oct. 1, 1991

[54] LIQUID ELECTROPHOTOGRAPHIC TRANSFERRING APPARATUS

[75] Inventors: Hisao Oh-ishi; Tetuo Usui; Nobuo Suzuki, all of Kanagawa, Japan

[73] Assignee: Fuji Photo Film Co., Ltd., Kanagawa, Japan

[21] Appl. No.: 507,286

[22] Filed: Apr. 10, 1990

[30] Foreign Application Priority Data

| Apr. 13, 1989 | [JP] | Japan | 1-94181 |
| Apr. 14, 1989 | [JP] | Japan | 1-94361 |
| Apr. 14, 1989 | [JP] | Japan | 1-94362 |
| Oct. 20, 1989 | [JP] | Japan | 1-272919 |

[51] Int. Cl.[5] .................................. G03G 15/10
[52] U.S. Cl. .......................... 355/256; 118/660; 355/274
[58] Field of Search ............... 355/256, 257, 273, 279, 355/255; 430/118, 119; 118/660, 659, 661, 651

[56] References Cited

U.S. PATENT DOCUMENTS

| 3,812,514 | 5/1974 | Watabe | 354/317 |
| 4,286,039 | 8/1981 | Landa et al. | 118/661 X |
| 4,325,627 | 4/1982 | Swidler et al. | 118/651 X |
| 4,420,244 | 12/1983 | Landa | 355/256 X |
| 4,897,691 | 1/1990 | Dyer et al. | 355/288 |
| 4,947,201 | 8/1990 | Niv et al. | 355/256 |

FOREIGN PATENT DOCUMENTS

| 2164981 | 4/1973 | Fed. Rep. of Germany | 355/255 |
| 46-1799 | 1/1971 | Japan . | |
| 51-44654 | 11/1976 | Japan . | |
| 0010442 | 1/1978 | Japan | 355/255 |
| 1225975 | 1/1979 | Japan . | |
| 55-95971 | 7/1980 | Japan . | |
| 0103578 | 8/1980 | Japan | 355/296 |
| 0058181 | 4/1982 | Japan | 355/296 |
| 0186775 | 11/1982 | Japan | 355/255 |
| 61-180248 | 8/1986 | Japan . | |
| 1-225975 | 9/1989 | Japan . | |
| 1205123 | 1/1986 | U.S.S.R. | 355/257 |

Primary Examiner—Joan H. Pendegrass
Assistant Examiner—Thu Dang
Attorney, Agent, or Firm—Sughrue, Mion, Zinn, Macpeak & Seas

[57] ABSTRACT

An image is exposed to light after a conductive and photoconductive material has been charged so that the charge of the portion exposed to light is neutralized and a latent image is thereby formed. Toner particles in a liquid developer are adsorbed onto the non-exposed portion so that development is performed. Then, the toner particles are dried by a drying device and thus aggregated toner particles are transferred to a transferring material due to an electrostatic force. Since the toner image is temporarily dried and is transferred in the aggregated form corresponding to the shape of the image, image disorder due to liquid fluidization that takes place at the time of liquid transference can be prevented. Therefore, a high quality transferred image is obtained.

23 Claims, 7 Drawing Sheets (A)

(B)

(C)

LIGHT

(D)

LIQUID ELECTROPHOTOGRAPHIC TRANSFERRING APPARATUS

BACKGROUND OF THE INVENTION

1. Field of the Invention

The present invention relates to a liquid electrophotographic transferring apparatus for transferring a toner image, formed on an image carrier by using a liquid developer, to a transferring material.

2. Background Information

Hitherto, there have been apparatuses for developing a latent image on a photoconductive body using a liquid developer and transferring the thus developed image onto a transferring material such as transferring paper.

A known apparatus of the type described above is arranged in such a manner that an electrostatic latent image on a photoconductive body is developed using a liquid developer and then the developed image on the photoconductive body and a transferring material overlap each other when a sufficient quantity of carrier liquid is present so as to transfer the image onto the transferring material by means of a corona transference or a bias-roller transference.

However, the apparatus of the type described above sometimes encounters a problem in terms of disorder of the transferred image due to the fluidization of the carrier liquid existing between the transferring material and the photoconductive body at the time of the image transference.

Another apparatus is known which is arranged to perform image transference by bringing the developed photoconductive body and the transferring material into hermetic contact with each other by a roller. However, the apparatus of the above-described type has a problem in that the image on the photoconductive body becomes disordered or the transferred image flows since the carrier liquid on the photoconductive body is fluidized at the time of the above-described contact.

A means for overcoming the above-described problems has been disclosed in Japanese Patent Publication No. 46-1799. The apparatus is arranged in such a manner that two transferring rollers are provided and the first roller has reversed bias when compared to the second roller. With an apparatus of this type, the disorder of the transferred image is prevented to a certain degree but the degree of prevention is not satisfactory.

Another apparatus has been disclosed in Japanese Patent Publication No. 51-44654 in which the image transference is performed after the thickness of the carrier liquid on the photoconductive body has been controlled from 5 to 30 $\mu$m by means of a corona discharge of the developer. With an apparatus of this type, the above-described problems is overcome, the transference efficiency is improved. In addition, the unnecessary penetration of the liquid into the transferring material is prevented by making the carrier liquid of a sufficient quantity to perform the wet transference present between the photoconductive body and the transferring material.

According to the method described above, the flow of the transferred image due to the excess quantity of carrier liquid present at the time of the transference is prevented to a certain degree due to the above-described liquid thickness control. However, it involves a problems in that the image on the photoconductive body is disordered due to a corona discharge conducted for the purpose of controlling the liquid thickness. An apparatus has been disclosed in Japanese Patent Laid-Open no. 55-95971 in which a resin solution is interposed between the photoconductive body and a transferring sheet so that the transference quantity is uniform. However, the image disorder that takes place at the time of the image transference cannot be prevented sufficiently.

The applicant of the present invention has disclosed a method in Japanese Patent Application No. 63-052937 based upon a fact that the quality of the transferred image can be improved by arranging the quantity of the carrier liquid to be from 2 to 20 mg per 1 mg of toner after toner development. However, the above-described method encounters a difficulty to control the weight of the carrier liquid and suffers from unsatisfactory quality of the transferred image.

The quality of the image obtained by a so-called commercial printing is higher than that obtained by copying machines which usually employ an electrophotographic method. For example, the 1% half tone of 200 LPI (Line Pair per Inch) corresponds to a diameter of about 16 $\mu$m and a resolving power of 35 lp/mm or more is necessary.

According to Japanese Patent Laid-Open No. 61-180248, the liquid electrophotographic apparatuses usually use tone of relatively smaller particle size (1 $\mu$m or less) in comparison to dry-type electrophotographic apparatuses.

However, the resolving power excessively deteriorates when the image is transferred to the transferring material. Therefore, the quality corresponding to the above-described printing level cannot be obtained.

SUMMARY OF THE INVENTION

An object of the present invention is to provide a liquid electrophotographic transferring apparatus capable of obtaining high quality transferred images and exhibiting an excellent transference efficiency without collapse or disorder of the image when the image formed by a liquid developer is transferred to a transferring material.

According to the present invention, a liquid developer is supplied at a development portion after the conductive and photoconductive body has been charged and exposed to light. Toner particles in the developer is adsorbed by the residual charge in the non-exposed portion so that a toner image is formed. After the development has been completed, the toner particles are dried and are condensed or aggregated. Therefore, any flow of the image is prevented when the conductive and photoconductive body has been brought into hermetic contact with a transferring material in the transferring portion of the ensuing process. As a result, a high quality image can be obtained.

As a result of supplying rinse liquid to the conductive and photoconductive body after the development, unnecessary toner particles can be removed. Furthermore, the image transference can be conducted smoothly by supplying the liquid to the toner image before the transference. A reliable close contact transference can be conducted by arranging at least either the conductive and photoconductive body of the transferring material to be made of a soft material.

The toner particles can be easily separated from the conductive and photoconductive body by applying a reversed charge to the charge of the toner particles to the conductive and photoconductive body which has been dried. Furthermore, when the exposure is conducted after the charge of the same polarity as that of the toner particles has been applied to the conductive and photoconductive body which has been dried, the adsorption force acting between the toner image and the conductive and photoconductive body is strengthened. Therefore, the undesired flowing of toner particles having a small charge from the conductive and photoconductive body can be prevented. As a result, the quality of the transferred image is improved.

Other and further objected, features and advantages of the invention will be appear more fully from the following description.

DESCRIPTION OF THE PREFERRED EMBODIMENTS

First embodiment

Figure 1:
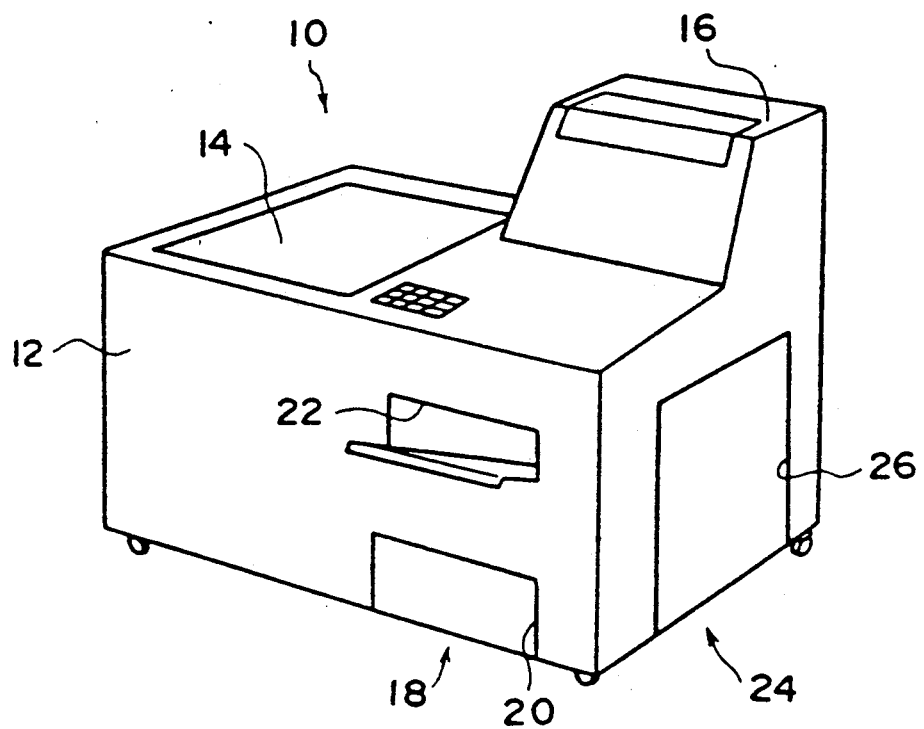
FIG. 1 is an overall perspective view which illustrates a first embodiment of a wet electrophotographic transferring apparatus according to the present invention.
Figure 2:
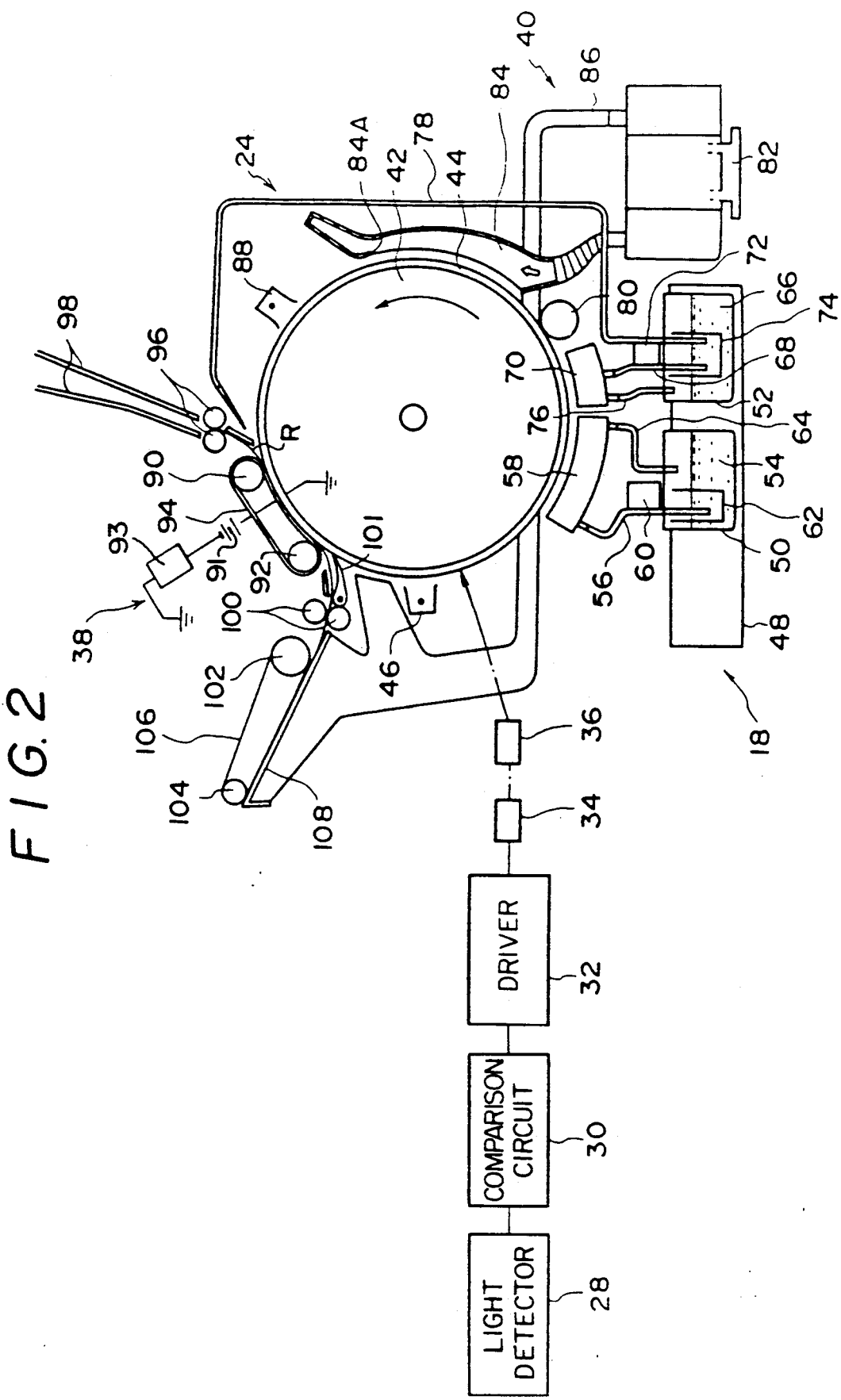
FIG. 2 is a cross-sectional view which illustrates an essential portion of the first embodiment of the present invention.

FIGS. 1 and 2 illustrates a first embodiment of a liquid electrophotographic transfer apparatus 10 according to the present invention. FIG. 1 is a perspective view which illustrates the appearance of the liquid electrophotographic transfer apparatus 10. FIG. 2 is a cross-sectional view illustrating a transferring portion formed in the liquid electrophotographic transfer apparatus 10.

FIG. 1 shows that the liquid electrophotographic transfer apparatus 10 has an original document tray 14 positioned on the upper surface of the apparatus body 12 and a transferring material insertion portion 16 projecting upwards from the upper surface of the apparatus body 12. Formed in the front surface in the lower portion of the apparatus body is an insertion port into which a developing unit 18 (see FIG. 2) is inserted. Accommodated inside the developing unit 18 is liquid developer formed above the insertion port 20 is a discharge port 22 from which a transferring material, onto which an image of an original document has been transferred, is discharged. Another insertion port 26 is provided into which a photoconductive mechanical unit 24 (see FIG. 2) is inserted. The insertion port may be formed in either of the side surfaces of the apparatus body 12. The apparatus body 12 includes a lamp (omitted from illustration) for applying light to an original document placed on the original document tray 14. As shown in FIG. 2, a detector 28 for detecting light from the image of the original document is positioned in the apparatus body 12. The detector 28 is connected to a comparison circuit 30. The comparison circuit 30 is connected to a driver 32 for controlling a semiconductor laser 34. The semiconductor laser 34 emits a laser beam toward a polygon mirror 36 which rotates at high speed. The high speed rotation of the polygon mirror 36 causes the laser beam to be reflected onto a photoconductive material in the photoconductive mechanical unit 24 so that an image is exposed to light. The high speed rotation of the polygon mirror 36 causes the image of the original document to be subjected to main scanning.

Therefore, light from the image is detected by the detector 28. The results of the detection is supplied, in the form of an electric signal, to the comparison circuit 30 where the signal is processed. The comparison circuit 30 then transmits an image signal, which has been digitized, to the driver 32. The driver 32 causes the semiconductor laser 34 to emit a laser beam in accordance with the contents of the supplied digitized-image signal. As a result, a static latent image is formed on a photoconductive material 44. The static latent image is toner-developed by the liquid developer in the developing unit 18, and is transferred to a transferring material which has been inserted into the transferring material insertion portion 16. The transferring material onto which the toner image has been transferred is discharged outside the apparatus body 12 through the discharge port 22.

As shown in FIG. 2, a transferring portion 38 comprises a photoconductive mechanical unit 24, a developing unit 18 and a drying apparatus 40.

The photoconductive mechanical unit 24 is provided with a photoconductive drum 42 which is connected to a rotating means (not shown) so as to rotate counterclockwise when viewed in FIG. 2. The photoconductive drum 42 has the photoconductive material 44 on the outer surface thereof. The photoconductive material 44 is exemplified by known organic or inorganic photoconductive materials. Furthermore, dielectric substances charged by means of a charging needle may be employed.

A variety of organic photoconductive materials are known. Specifically, there are materials available as disclosed in an article titled "Electrophotography Element, Material and Process" on pp. 61 et seq. of vol. 10938, "Research Disclosure" published in May, 1973.

Organic photoconductive materials which have been put into practical use are exemplified by: an electrophotography sensitive material composed of poly-N-vinyl carbazole and 2,4,7-trinitrofluorene-9-on as disclosed in U.S. Pat. No. 3,484,237; a material prepared by sensitizing poly-N-vinyl carbazole by a pyrylium salt type coloring agent (Japanese Patent Publication No. 48-25658); an electrophotography sensitive material whose main component is an organic pigment (Japanese Patent Laid-Open No. 49-37543); an electrophotography sensitive material whose main component is an eutectic complex composed of a dyestuff and a resin (Japanese Patent Laid-Open No. 47-10735); and an electrophotography sensitive material prepared by dispersing copper phthalocyanine in a resin (Japanese Patent Publication No. 52-1667). Furthermore, materials disclosed from pp. 62 to 76 in a magazine published by the Electrophotography Society Vol. 25, No. 3 (1986) have been put to practical use.

Inorganic photoconductive substances for use in the present invention are exemplified by a variety of inorganic compounds disclosed from pp. 260 to 374 and other pages of "Electrophotography", by R. M. Schaffert, published by Focal Press (London), 1975. Specifically, it is exemplified by zinc oxide, zinc sulfide, cadmium sulfide, selenium, selenium-tellurium alloy, and selenium-arsenic alloy and selenium-tellurium-arsenic alloy.

Furthermore, amorphous silicone is available.

A corona charger 46 is disposed above the position upon which the laser beams are made incident and is connected to a power source (omitted from illustration). Therefore, the surface of the sensitive body 44 is uniformly charged by the corona charger 46. The photoconductive material 44 is then rotated counterclockwise when viewed in FIG. 2, causing light from the image of the original document to be made incident upon the surface of the photoconductive material 44 which becomes conductive, causing the charge on the surface to be eliminated. As a result, a static latent image is formed on the surface of the photoconductive material 44.

The developing unit 18, inserted through the insertion port 20, is provided below the position where the light from the image of the original document is made incident.

A developing unit body 48 of the developing unit 18 is in the form of a box whose upper portion is open. The developing unit 18 accommodates a liquid developer bottle 50 and a rinse liquid bottle 52.

A liquid developer 54 is in the liquid developer bottle 50. Any other known developer may also be employed as the liquid developer 54. For example, the following developers may be employed: any of the developers disclosed in Japanese Patent Publication No. 35-5511, Japanese Patent Publication No. 35-13424, Japanese Patent Publication No. 50-40017, Japanese Patent Publication No. 49-98634, Japanese Patent Publication No. 58-129438, Japanese Patent Laid-Open No. 61-180248, "The Basics and Applications of Electrophotography Technology" (by Electrophotography Society, Corona (1988)) or the like.

The above-described liquid developers usually includes a carrier liquid, a coloring agent forming toner particles, a covering agent made of a polymeric resin giving the coloring agent a fixing characteristic, a dispersant for promoting the dispersion of the toner particles or stabilizing the dispersion, and a charge adjustment agent for controlling the polarity of the toner particles and the quantity of the charge.

As the covering agent, a variety of known resins can be employed. In particular, it is preferable that any of the following ethylene copolymers by used: a copolymer of ethylene and (meta) acrylic acid, a copolymer of ethylene and vinyl acetate, a copolymer of ethylene and ethylacrylate, a copolymer of ethylene and (meta) acrylic ester and ternary copolymer of ethylene (meta) acrylic acid and (meta) acrylic acid disclosed in Japanese Patent Laid-Open No. 61-180248, Japanese Patent Laid-Open No. 63-41272 and Japanese Patent Laid-Open No. 63-41273.

As the carrier and rinse liquid, a non-polar and nonaqueous agent having an electric resistance of more than $1 \times 10^9 \Omega$. cm and a dielectric constant of 3 or less may be employed. The nonaqueous agent is exemplified by solvents of straight chain or branch aliphatic hydrocarbons, cycloparaffins, aromatic hydrocarbons and halogenated hydrocarbons. It is preferable in terms of the volatility, safety and smell that the following petroleum solvents be used; octane, isooctane, decane, isodecane, dodecane, isododecane, nonane, Isoper E, Isoper G, Isoper H and Isoper L ("Isoper" is a trade name of Exxon), Solbetz 100 and Shellzol 71 (manufactured by Shell).

Although the concentration of the toner particles in the developer is not particularly limited, it is preferable that it be arranged to be 0.1 to 10 g per 1 l of the developer (that is, 100 g to 1000 g of carrier liquid to 1 g of toner particle).

As the charge adjustment agent, a variety of known agents may be used in a concentration of 0.01 to 10 g per 1 l of the developer; preferably 0.01 to 1 g. Also the dispersant may employ a variety of known types in a concentration of 0.01 to 50 g per 1 l of developer; preferably 0.1 to 10 g.

An end portion of a conduit 56 is inserted into the liquid developer 54 in the developer bottle 50. Another end portion of the conduit 56 is connected to a developer supply member 58. A developer supply pump 60 is provided along the conduit 56. Furthermore, a filter 62 is positioned around the portion of the conduit 56 inserted into the liquid developer 54. An end portion of a conduit 64 is connected to the developer supply member 58, while the other end portion is in an open state inside the developer bottle 50. The developer supply member 58 is positioned adjacent to the photoconductive material 44 and has a plurality of developer delivery ports facing the photoconductive material 44. Therefore, when the developer supply pump 60 is operated, the liquid developer 54 passes through the filter 62 so as to be filtered. Then, the liquid developer 54 is supplied to the developer supply member 58 via the conduit 56 whereupon, the liquid developer 54 is delivered to the surface of the photoconductive material 44 through the developer delivery ports. After the liquid developer 54 has been delivered to the surface of the photoconductive material 44, any excess quantity of liquid developer 54 is recovered into the developer bottle 50 via the conduit 64.

An end portion of a conduit 68 is inserted into rinse liquid 66 in the rinse liquid bottle 52 while the other end is connected to a rinse liquid supply member 70. A rinse liquid supply pump 72 is provided along the conduit 68. Furthermore, a filter 74 is provided around the portion of the conduit 72 inserted into the rinse liquid 66. An end portion of a conduit 76 is connected to the rinse liquid supply member 70, while the other end portion is in an open state inside the rinse liquid bottle 52. The rinse liquid supply member 70 is positioned adjacent to the photoconductive material 44 and has a plurality of rinse liquid delivery ports facing the photoconductive material 44. Therefore, when the rinse liquid supply pump 72 is operated, the rinse liquid 66 passes through the filter 74 so as to be filtered. Then, the rinse liquid 66 is supplied to the rinse liquid supply member 70 via the conduit 68. Any excess quantity of the rinse liquid 66 is recovered into the rinse liquid bottle 52 via the conduit 76.

An end portion of a conduit 78 is connected to the rinse liquid bottle 52, while the other end portion projects above the photoconductive drum 42 in an open state between a transferring agent to be described later and the photoconductive material 44.

A squeeze roller 80 is provided downstream from the rinse liquid supply member 70 in the rotational direction of the photoconductive drum 42 in such a manner that it comes in contact with the surface of the photoconductive material 44. The squeeze roller 80 squeezes off the rinse liquid 66 supplied to the surface of the photoconductive material 44. The squeezed reduces the thickness of the rinse liquid 66 to 100 μm or less; preferably 50 μm or less.

A drying device 40 is provided to the side of the developer unit 18. The drying device 40 has an air pump 82 to which an end portion of an air duct 84 is connected. An intermediate portion of the air duct 84 is raised along the surface of the photoconductive material 44. The other end portion of the air duct 84 is opened upwards. An intermediate portion of the air duct 84 facing the photoconductive material 44 has an opening 84A opened toward the photoconductive material 44. Therefore, dried air supplied from the air pump 82 is applied to the surface of the photoconductive material 44. The quantity of air applied is 1 l/minute or more; preferably 10 l/minute or more, further preferably 100 l/minute or more. The air application time is 1 second or longer; preferably 10 seconds or longer, and further preferably 30 seconds or longer.

An end portion of an air duct 86 is connected to the air pump 82. The other end portion of the air duct 86 branches into two ducts above the corona charger 46. Either of the branched duct is open toward the photoconductive material 44, while the another duct projects upwards and opens toward the reverse side of a guide plate 108 to be described later.

A charger 88 is provided above the air duct 84 in such a manner that is faces the surface of the photoconductive material 44. The charger 88 applies reversed polarity voltage and toner particles to the dried photoconductive material 44. That is, if the toner particles are negatively charged, positive voltage is applied to the photoconductive material 44. If the toner particles are positively charged, negative voltage is applied to the same. Thus, the charge of the same polarity as that of the toner particles is generated in a conductive layer disposed inside the photoconductive layer of the photoconductive material 44. The thus generated charge is coupled to the charge retained in the photoconductive layer so that the retained charge is neutralized. As a result, electrostatic force attracting the toner particles to the photoconductive layer is weakened, causing the transference of the toner image to be conducted easily.

Two rollers 90 and 92 are positioned above the photoconductive drum 42 between the corona charger 46 and the charger 88. The two rollers 90 and 92 are provided along the outer periphery of the photoconductive material 44. An endless belt 94 is arranged between the two rollers 90 and 92. The portion of the endless belt 94 adjacent to the photoconductive material 44 comes in contact with the photoconductive material 44. A transfer material R is inserted between the endless belt 94 and the photoconductive material 44. A power source 91 and a control circuit 93 are provided for the purpose of applying reversed polarity voltage to the toner particles to the transfer material R held between the photoconductive material 44 and the endless belt 94. The endless belt 94 is made of a soft material, for example, rubber, felt or the like so that the transfer material R is abutted against the surface of the photoconductive material 44 with an abutting force of 0.1 kg/cm$^2$ to 2.0 kg/cm$^2$; preferably 0.5 kg/cm$^2$ to 1.5 kg/cm$^2$.

The rollers 90 and 92 are soft rollers made of rubber or sponge so that they have soft surfaces. A pair of conveying rollers 96 is positioned above the roller 90. A pair of guides 98 is positioned above the pair of conveying rollers 96. The pair of conveying rollers 96 is rotatably supported by a pair of side plates (omitted from illustration) and rotated by a rotating force transmitted form a rotating means (omitted from illustration). As a result, the transferring material R which has been introduced through the transferring material insertion portion 16 and the guided by the pair of guides 98 is inserted and held so as to be conveyed. The transferring material R to be inserted is made of above described material, and is made of a soft material. Instead of this, photoconductive material 44 is made of a soft material. Forming at least the transferring material R or photoconductive material 44 by a soft material is applicable.

A pair of conveyance rollers 100 is provided to the side of the roller 92. A separating claw 101 is provided between the pair of conveying rollers 100 and the roller 92. The separating claw 101 separates the transferring material R from the photoconductive material 44 and inserts it between the pair of conveying rollers 100.

Rollers 102 and 104 are provided to the side of the pair of conveying rollers 100. An endless belt 106 is arranged between the rollers 102 and 104. A guide plate 108 is positioned corresponding to the lower portion of the endless belt 106 in such a manner that the guide plate 108 comes in contact with a half the circumference of the endless belt 106. The transferring material R conveyed from the pair of conveying rollers 100 is inserted between the guide plate 108 and the endless belt 106. The guide plate 108 is positioned at the opening of the air duct 86. Therefore, the transferring material R is dried by air supplied from the drying device 40 through the air duct 86.

The transferring material R is not particularly limited to this embodiment and a variety of materials can thereby be employed. For example, plain paper, a variety of surface coating paper sheets, ZnO coating paper, an aluminum substrate for a form plate, a plastic film made of polyethylene telephthalate, polyethylene, triacetyl cellulose, a film to which any of various film metals is evaporated or a film coated with any of various polymers.

As for an aluminum substrate for a form plate, all aluminum substrates which are used as ordinary presensitizing plates (PS plate) may be used. It is preferable that an aluminum substrate whose surface has been subjected to treatment where it has a sand-like pattern, or so-called graining or anodic oxidation treatment, be employed.

Next, the operation of the first embodiment will be described.

First, power for the liquid electrophotography transferring apparatus 10 is turned on. Next, an original document, onto which an image to be transferred is recorded, is placed on the original document tray 14. The transferring material R from the transferring material insertion portion 16, is inserted into the apparatus body 12.

When a transfer start switch (omitted from illustration) is switched on, the corona charger 46 is operated, causing the surface of the photoconductive material 44 to be uniformly charged. Simultaneously, the photoconductive drum 42 is rotated counterclockwise when viewed in FIG. 2 by a rotating means (omitted from illustration). When the photoconductive material 44 whose surface has been uniformly charged is shifted to a position at which it is exposed to light, light is applied to the original document placed on the original document tray 14. The light from the image of the original document is detected then by the detector 28. The results of this detection is, transmitted in the form of an electric signal to the comparison circuit 30. The digitized signal of the original document image is transmitted from the comparison circuit 30 to the drive 32. The comparison circuit 30 causes the semiconductor laser 34 via the driver 32 to apply the laser beam corresponding to the original document image. As a result, the photoconductive body 44 is exposed to the image.

After the surface of the photoconductive material 44 has been exposed to the image, the portion to which the laser beam have been applied becomes conductive, causing the charge on its surface to be removed. As a result, a static latent image corresponding to the original document image is formed.

The photoconductive material 44 on which the static latent image has been formed is further rotated counterclockwise, when viewed in FIG. 2, until it faces the developer supply member 58.

The developer supply member 58, is supplied with developer 54 through the operation of the developer supply pump 60. The developer 54 is then discharged onto the surface of the photoconductive material 44 through a developer discharge port (omitted from illustration). As a result, toner particles in the developer adhere to both the portion onto which the static latent image is formed and to the other portion onto which no image is formed. Thus, a static latent image is made into a developed image, causing a toner image to be formed corresponding to the portion onto which the static latent image is formed and the other portion onto which no image is formed.

The photoconductive material 44 onto which the toner image has been formed through the adhesion of the toner particles is further rotated counterclockwise when viewed in FIG. 2 until it faces the rinse liquid supply member 70. The rinse liquid supply member 70 is supplied with the rinse liquid 66 by the rinse liquid supply pump 72. The rinse liquid 66 is then discharged onto the surface of the photoconductive material 44 through rinse liquid discharge ports (omitted from illustration). As a result, the developer and the excess toner particles that adhere to the portion of the surface of the photoconductive material 44 onto which the toner image is formed and to the other portion in which no image is formed are washed out.

The photoconductive material 44, from which unnecessary substances have been washed out by the rinse liquid 66, is held between the squeeze roller 80 and the photoconductive drum 42 so that the portion of the rinse liquid retained on the surface of the photoconductive material 44 is squeezed off. In this state, a toner image has been formed onto the surface of the photoconductive material 44 since the toner particles have been electrostatically adhered to both the portion in which the image of the original document image is formed and the portion in which no image is formed.

In this state, the photoconductive material 44 is further rotated counterclockwise when viewed in FIG. 2, until it faces the opening 84A of the air duct 84. Dry air supplied from the air pump 82 is discharged onto the surface of the photoconductive material 44 through the opening 84A of the air duct 84. As a result of the application of dry air, the wet photoconductive material 44 is dried. Since the photoconductive material 44 has been dried, carrier liquid (rinse liquid) present between the toner particles forming the static latent image evaporates. This causes the interaction (bonding force) between the toner particles to be raised. The drying of the photoconductive material 44 is conducted so as to make the quantity of the rinse liquid 66 serving as the carrier liquid 20 mg or less per 1 mg of the toner particles; preferably 10 mg or less, or further preferably 5 mg or less.

Since the rinse liquid is squeezed off the photoconductive material 44 by the squeeze roller 80 prior to the drying operation of drying device 40, the necessary quantity of drying air to be supplied can be significantly reduced. Thus, the smell from the evaporating organic solvent is reduced. Furthermore, the unequal image formation due to the air supply can be prevented.

The photoconductive material 44 which has been dried by drying air is further rotated counterclockwise, when viewed in FIG. 2, so as to be applied with a charge of the reverse polarity as that of the toner particles by the charger 88. As a result, the static absorption force acting between the toner image and the photoconductive drum 42 can be weakened. In this state, the photoconductive material 44 comes in contact with the endless belt 94.

The transferring material R which has been inserted into the apparatus body 12 through the transferring material insertion portion 16 is guided by the pair of guide 98 so as to be inserted between the pair of conveying rollers 96. The transferring material R is then conveyed between the photoconductive material 44 and the endless belt 94 so that the transferring material R is hermetically brought into contact with the photoconductive material 44. The rinse liquid 66 is supplied between the photoconductive material 44 and the transferring material R through the conduit 78 due to the operation of the rinse liquid supply pump 72. The rinse liquid 66 may be supplied to either the photoconductive material 44 or the transferring material R. However, in the case where the transferring material R exhibits high liquid absorption characteristics, the quantity of the rinse liquid 66 to be supplied can be reduced when it is supplied to the photoconductive material 44. As a result of the supply of the rinse liquid 66, the transferring material R can be easily separated from the photoconductive drum 42 though the condensed toner image has been formed. As described above, according to this embodiment, since the endless belt 94 is made of a soft material and the transferring material R is pressed by the soft endless belt 94, stable image transference can be conducted with a simple structure, without cracks or collapse of the toner image formed, by bonding the toner particles to one another.

The transferring material R has been supplied with a transferring voltage of reversed polarity from electric source 91 to that of the toner particles. Therefore, the toner particles which are adhered to the surface of the photoconductive material 44 are caused to pass through the rinse liquid since the toner particles are attracted to the surface of the transferring material R. As a result, the toner particles are adhered to the transcribing material R so that the transferred image is formed by the toner particles on the transferring material R. Thus, the image of the original document is formed on the surface of the transferring material R.

When the toner particles on the photoconductive material 44 are adhered to the surface of the transferring material R, the voltage level to be applied to the transferring material R can be lowered since the charge of the toner particles has been substantially reduced after the substantial drying of the surface of the photoconductive material 44. As a result of an experiment carried out by the inventors of the present invention, transference could be achieved with a voltage of 50 V in comparison to the conventional method in which 200 V were applied to the aluminum substrate.

In the above-described experiment, the quantity of the adhered toner particles was more than 0.2 mg/cm$^2$ was obtained. Furthermore, since the rinse liquid 66 is supplied between the transferring material R and the photoconductive material 44 at the time of transference, the disorder of the image due to the flow of the toner particles at the time of the transference can be prevented. In addition, image transference can be assuredly conducted since the toner image can be readily separated from the photoconductive drum 42 due to the application of reversed polarity voltage to the toner particles by the charger 88.

The quantity of the supplied rinse liquid 66 is determined depending upon the type of transferring material R. For example, in the case where the transferring material R is of a type that does not absorb the rinse liquid which is an nonaqueous solvent, such as an aluminum substrate or a polyethylene telephthalate film, it is preferable that the quantity be 2 to 80 g/m$^2$; further preferably 2 to 40 g/m$^2$.

In the case where paper or the like is employed to serve as the transferring material R, it is difficult to specify the quantity of the supplied rinse liquid since it must be determined depending upon the type of the paper. For example, whether it is plain paper, coated paper, art paper or waterproof paper. The thickness of the paper is also important. However, in the case of plain paper (plain paper copying transferring paper "Copy Ace A"), it is preferable that it be 20 to 80 g/m$^2$.

The transferring material R on which the toner image has been transferred is separated from the surface of the photoconductive material 44 by the separating claw 101 so as to be inserted between the pair of conveying rollers 100. The transferring material R is conveyed by the pair of conveying rollers 100 and inserted between the guide plate 108 and the endless belt 106. From a portion beneath the guide plate 108 dry air is supplied by the air duct 86 so as to blow on to the transferring material R. As a result, the transferring material R which as been wetted by the rinse liquid 66 is dried off. The dried transferring material R is discharged through the discharge port 22 to the outside of the apparatus body 12 so as to be placed on a transfer material tray (omitted from illustration).

On the other hand, the photoconductive material 44 from which the transferring material R has been separated by the separating claw 101, is again uniformly charged by the corona charger 46 so that light from the image of the next original document is made incident upon the photoconductive material 44.

As described above, in this embodiment since the photoconductive material 44 is dried prior to the transference of the image, the conventional resolving power of the transferred image of 25 lp/mm can be improved to 50 lp/mm.

The method of transferring the toner image onto the photoconductive material 44 to the transferring material is not particularly limited. For example, the following methods can be employed: an electrostatic transferring method such as a corona transference, a bias roller transference and a transferring method in which voltage is directly applied in the case where the transferring material R is a conductive material.

Next, the another embodiment will be described with reference to FIGS. 2 and 3.

Second embodiment

Figure 3:
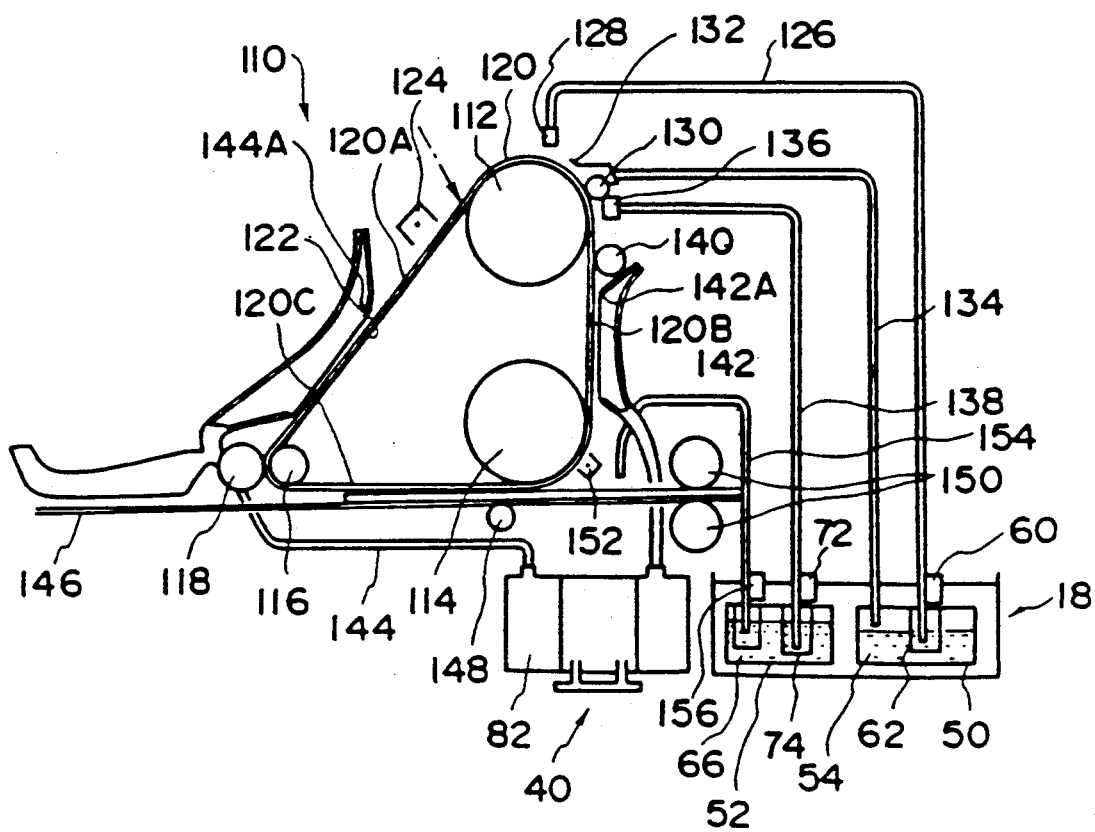
FIG. 3 is a cross-sectional view which illustrates an essential portion of a second embodiment of the present invention.

In a second embodiment a transferring portion 110 has two rollers 112 and 114 arranged vertically as shown in FIG. 3. A roller 116 having a small diameter is disposed beside the roller 114. The roller 116 having the small diameter is positioned in contact with the roller 118. The roller 116 having a small diameter and roller 118 are positioned so as make contact. Both rollers 116, 118 are arranged to be rotated by a rotating force transmitted from a rotating means (omitted from illustration). An endless belt 120 is arranged around the rollers 112, 114 and 116 forming a substantially triangular shape so that a slant portion 120A, a vertical portion 120B and a horizontal portion 120C are formed. As a result, the endless belt 120 is held between the roller 116 having the small diameter and the roller 118. When the roller 116 having the small diameter and the roller 118 are rotated by force transmitted from the rotating means (omitted from the illustration), the endless belt 120 is rotated clockwise when viewed in FIG. 3. A photoconductive material 122 made of photoconductive layer is applied to the entire outer peripherial surface of the endless belt 120. The photoconductive material is the same as that employed in the first embodiment.

A laser beam emitted from the upper side portion (in a direction designated by an arrow A of FIG. 3) of the photoconductive material 122 is made incident upon the photoconductive material 122.

A corona charger 124 is provided below the position upon which the light from an image is made incident. A power source (omitted from illustration) in connected to the corona charger 124 so that the surface of the photoconductive material 122, which is being rotated clockwise when viewed in FIG. 2, is uniformly charged.

A developer supply port 128 fastened to one end portion of the conduit 126 and is positioned above the roller 120. Another end portion of the conduit 126 is connected to the developer bottle 50 of the developing unit 18. The developer supply pump 60 is positioned at an intermediate portion of the conduit 126 and a filter 62 is positioned around the end portion of the conduit 126 connected to the developer bottle 50. The liquid developer 54 accommodated in the developer bottle 50 resulting from the operation of the developer pump 60 passes through the filter 62 so as to be filtered. Then, the liquid developer 54 is supplied to the photoconductive material 122 through the developer supply port 128 after it has passed through the conduit 126.

A developer recovery roller 130 is positioned below the developer supply port 128 in such a manner that it comes in contact with the surface of the photoconductive material 122. The recovery roller 130 has a developer recovery port 132. The developer recovery port 132 is fastened at an end portion of a conduit 134. The other end portion of the conduit 134 is connected to the developer bottle 50. As a result, the excess quantity of the developer 54 on the photoconductive material 122 is squeezed off and passes through the conduit 134 so as to be recovered in the developer bottle 50.

A rinse liquid supply portion 136 is positioned below the recovery roller 130. The rinse liquid supply portion 136 is fastened to an end portion of a conduit 138. The other end portion of the conduit 138 is in an open state in the rinse liquid bottle 52 accommodated in the developing unit 18. A rinse liquid supply pump 72 is positioned at an intermediate position of the conduit 138 and a filter 74 is positioned around the end portion of the conduit 138 connected to the rinse liquid bottle 52. When the rinse liquid supply pump 72 is operated, the rinse liquid 66 is filtered by the filter 74 and then passes through the conduit 138. Next, the rinse liquid 66 is supplied to the surface of the photoconductive material 122 through the rinse liquid supply port 136.

A squeeze roller 140 is positioned below the rinse liquid supply port 136 in such a manner that it comes in contact with the surface of the photoconductive material 122. The squeeze roller 140 squeezes off the excess quantity of rinse liquid 66 from the surface of the photoconductive material 122.

An end portion of an air duct 142 is connected to an air pump 82 of a drying device 40 positioned in the side portion of the developing unit 18. The intermediate portion of the air duct 142 is arranged along the surface of the photoconductive material 122 to a position below the squeeze roller 140. The other end portion of the air duct 142 is in an open state beside the squeeze roller 140. An opening 142A facing the photoconductive material 122 is provided at an intermediate portion of the air duct 142. When the air pump 82 is operated, dry air passes through the air duct 142 so as to blow onto the surface of the photoconductive material 122 through the opening 142A.

An air duct 144 is provided for the air pump 82. An end portion of the air duct 144 branches into two branches at the side portion of the roller 118. The other end portion of the air duct 144 extends along the slant portion 120A of the endless belt 120 and is in an opened state beside the corona charger 124. The air duct 144 has an opening 144A opened toward the photoconductive material 122 which rests on the slant portion 120A of the endless belt 120. The other end of the air duct 144 extends upwards over the transferring agent support plate 146 positioned below the horizontal portion 120C of the endless belt 120. The intermediate portion of the air duct 144 has an opening toward the transferring agent support plate 146, while the front end portion of the air duct 144 is opened upwards.

In a lower portion of the transferring agent support plate 146 a roller 148 is disposed to support the transferring agent support plate 146. A pair of conveying rollers 150 is provided adjacent to the transferring agent support plate 146 (in the right side of the drawing sheet of FIG. 3). The transferring material R is inserted between the rollers of the pair of conveying rollers 150 so as to be conveyed between the horizontal portion of the photoconductive material 122 and the transferring agent support plate 146.

The transferring material R to be inserted is made of a soft material similar to the above-described first embodiment. In this case, at least either the photoconductive material 122 or the transferring material R must be of a soft material.

A charger 152 is positioned so as to face the roller 114, in order to charge the toner image which has been dried. This charging is conducted in such a manner the reversed polarity voltage is applied to the toner particles in a manner similar to the first embodiment. Similar effects as the first embodiment is caused therefrom.

An open end portion of the conduit 154 is faces transferring agent support plate 146. The other open end of the conduit 154 is in the rinse liquid bottle 52. A supply pump 56 is disposed at an intermediate portion of the conduit 154. Therefore, when the supply pump 156 is operated, the rinse liquid is supplied to the surface of the transferring material R.

Next, the operation of the second embodiment will be described.

First, an original document, onto which an image to be transferred is recorded, is placed on the original document tray 14 and the transferring material R is inserted into the apparatus body 12 through the transferring material insertion portion 16.

When a transfer start switch (omitted from illustration) is switched on, the corona charger 124 is operated so that the surface of the photoconductive material 122 is uniformly charged and the endless belt 120 is rotated counterclockwise by a rotating means (omitted from illustration) when viewed in FIG. 3. When the photoconductive material 122 whose surface has been uniformly charged reaches the exposure position, the image of the original document placed on the original document tray 14 is scanned so that a laser beam 34 is made incident upon the photoconductive material 122 via a polygon mirror 36 so that the photoconductive material 122 is exposed to light.

When the surface of the photoconductive material 122 has been exposed to light, the portion on which an image exists and the portion on which no image exists become conductive, causing the charge to be eliminated resulting in the formation of a static latent image.

The photoconductive material 122 on which the static latent image has been formed is further conveyed until it faces the developer supply port 128. The liquid developer 54 supplied by the developer supply pump 60 is discharged onto the surface of the photoconductive material 122. As a result, the toner particles in the liquid developer 54 adhere to the static latent image, causing the latent image to become a developed image. Therefore, the toner image corresponding to the image portion or non-image portion is formed.

The photoconductive material 122 onto which the toner image has been formed due to the adherence of the toner particles is further rotated counterclockwise until the excess quantity of liquid developer 54 is squeezed off by the developer recovery roller 130. The thus squeezed off liquid developer 54 is recovered in the developer bottle 50 after it has passed through the conduit 134 via the recovery port 132.

The photoconductive material 122 which has passed through the developer recovery roller 130 faces the rinse liquid supply port 136 so that the rinse liquid 66 supplied through the conduit 138 is supplied to the surface of the photoconductive material 122. As a result, unnecessary substances which have adhered to the surface of the photoconductive material 122 is washed off. The rinse liquid 66 on the photoconductive material 122 is squeezed off by the squeeze roller 140 and the photoconductive material 122 faces the opening 142A of the air duct 142. Dry air is supplied to the air duct 142 by the air pump 82 so that it is applied to the surface of the photoconductive material 122 through the openings 142A. Thus, the rinse liquid 66, serving as a carrier liquid present between the toner particles adhered to the surface of the photoconductive material 122 so as to form the toner image, is removed and aggregated, causing the distance between the toner particles to be shortened. As a result, the interaction (bonding force) between the toner particles is raised and a toner image of high resolving power can be formed since the toner particles do not disperse at the time of the transference.

The photoconductive material 122 onto which the toner image, in which the space between the toner particles has been aggregated. due to the dry air, has been formed is further conveyed unit it is charged by the charger 152.

The photoconductive material 122 whose surface has been charged by the charger 152 is conveyed to the horizontal portion 120C which confronts the transferring agent supply plate 146.

On the other hand, the transferring material R is inserted into the apparatus body 12 through the transferring material insertion portion 16. It is then conveyed through a conveyance passage (omitted from illustration), and is inserted between the rollers of the pair of conveying rollers 150. As a result, the transferring material R is inserted between the transferring material support plate 146 and the horizontal portion 120C of the photoconductive material 122. The toner image formed on the photoconductive material 122 is transferred to the transferring material R which is being conveyed between the photoconductive material 122 and the transferring material support plate 146. At the time of this transference, the rinse liquid 66 is supplied between the photoconductive material 122 and the transferring material R.

The outer periphery of the roller 114 which is made of a soft material. The photoconductive material 122 is pressed against the transcribing material R via the endless belt 120 and the soft roller 114. This embodiment is suitably used in the case where the transferring material R is made of a material having a relatively high rigidity and the photoconductive material 122 is made of a soft material. Therefore, the image transference is conducted in such a manner that the reverse side of the photoconductive material 122 is pressed by the roller made of a soft material.

Therefore, stable transference can be conducted with a simple structure, and high resolving power transference can be conducted.

The transferring material R onto which the toner image on the photoconductive material 122 has been transferred is conveyed toward the left side of the drawing as seen in FIG. 3. Dry air transmitted through the air duct 144 is applied through the opening so that the transferring material R is dried.

Also dry air is, through the air duct 144, applied to the photoconductive material 122 which is conveyed from the horizontal portion 120C to the slant portion 120A. The dried photoconductive material 122 is again charged uniformly by the corona charger 124 and the light from the image of the next original document is made incident upon the photoconductive material 122.

As described above, according to the second embodiment, since the transferring material R is held and conveyed between the horizontal portion 120C of the photoconductive material 122 and the transferring material support plate 146 positioned horizontally, it is suitable employed when a toner image is transcribed to a thick transferring material having relatively high rigidity.

Third embodiment.

A third embodiment of the present invention will now be described with reference to FIG. 4.

According to the third embodiment, the toner image formed on the photoconductive material is not directly transferred to the transferring material. Instead, the toner image is temporarily transferred to an intermediate body 160 and the toner image transferred to the intermediate body 160 is transferred to the transferring material.

Figure 4:
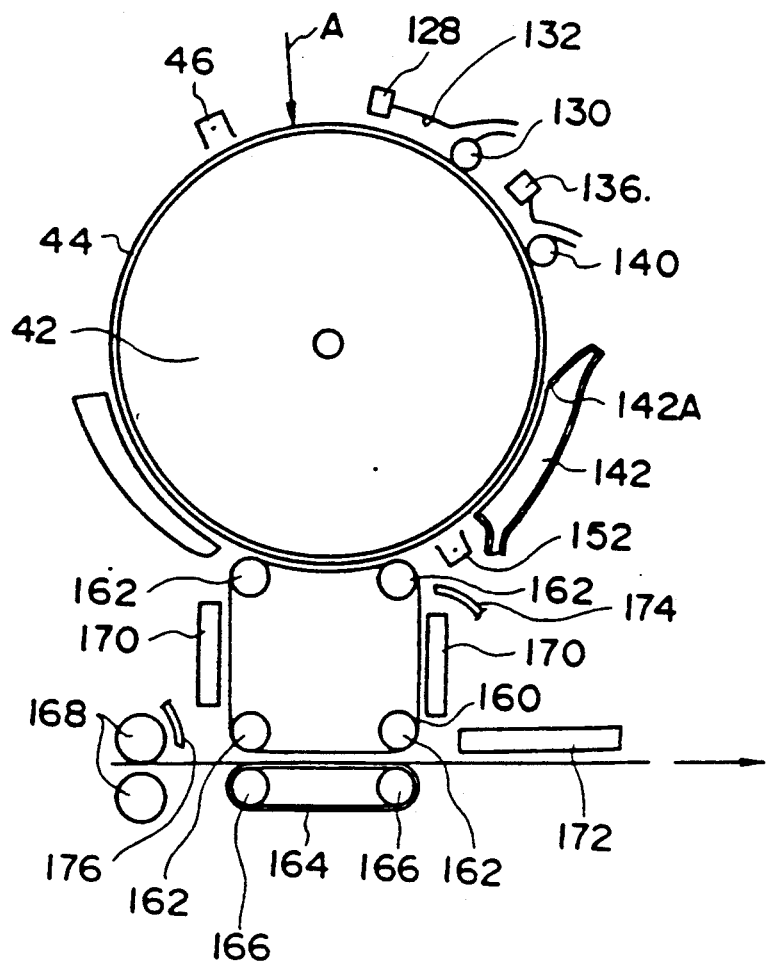
FIG. 4 is a cross-sectional view which illustrates an essential portion of a third embodiment of the present invention.

As shown in FIG. 4, the intermediate body 160 is wound round four rollers 162 located beneath the photoconductive drum 42. The upper portion of the intermediate body 150 is positioned to come in contact with the photoconductive material 44 on the photoconductive drum 42 so that the toner image formed on the photoconductive material 44 is transferred thereto. The rinse liquid 66 is supplied between the photoconductive material 44 and the intermediate body 160 through a conduit 174.

A transferring material support belt 164 is wound round two rollers 166 below the intermediate material 160. The transferring material transmitted form a pair of conveying rollers 168 is inserted between the transferring material support belt 164 and the lower portion of the intermediate body 160.

An end portion of a conduit 176 is in an open state between the pair of conveying rollers 168 and the transferring material support belt 164. The other end portion of the conduit 176 is connected to a rinse liquid bottle (omitted from illustration) so that the rinse liquid is supplied by a rinse liquid supply pump (omitted from illustration).

A dry portion 170 is disposed on each of the two sides of the intermediate body 160 so that dry air is applied to it from the air pump 82.

Another drying portion 172 is positioned above the transferring material on which the toner image has been transferred and after being transmitted between the lower portion of the intermediate body 160 and the transferring material support belt 164. Since dry air is supplied to the drying portion 172, the transferring material on which the toner image has been formed is dried.

Next, reversed polarity voltage is applied by the charger 152 to the toner particles so that the toner image can be easily separated form the photoconductive drum 42.

The toner image formed on the surface of the photoconductive material 44 is transferred to the intermediate body 160. The intermediate body 160 on which the toner image has been thus formed is dried by the drying portion 170 and its toner image is transmitted to the transferring material which has been transmitted from the pair of conveying rollers 168. At this time, the intermediate body 160 is applied with voltage and the rinse liquid 66 is supplied between the intermediate body 160 and the transferring material. The photoconductive material 44 whose toner image has been transcribed to the intermediate body 160 is dried and again charged uniformly by the corona charger 46 before light from the image of the next original document to be transferred is made incident upon the photoconductive body 44.

The intermediate body 160 whose toner image has been transferred to the transferring material is dried by the drying portion 170 and faces the photoconductive material 44 on which the toner image to be transferred next is formed.

Fourth embodiment

Figure 5:
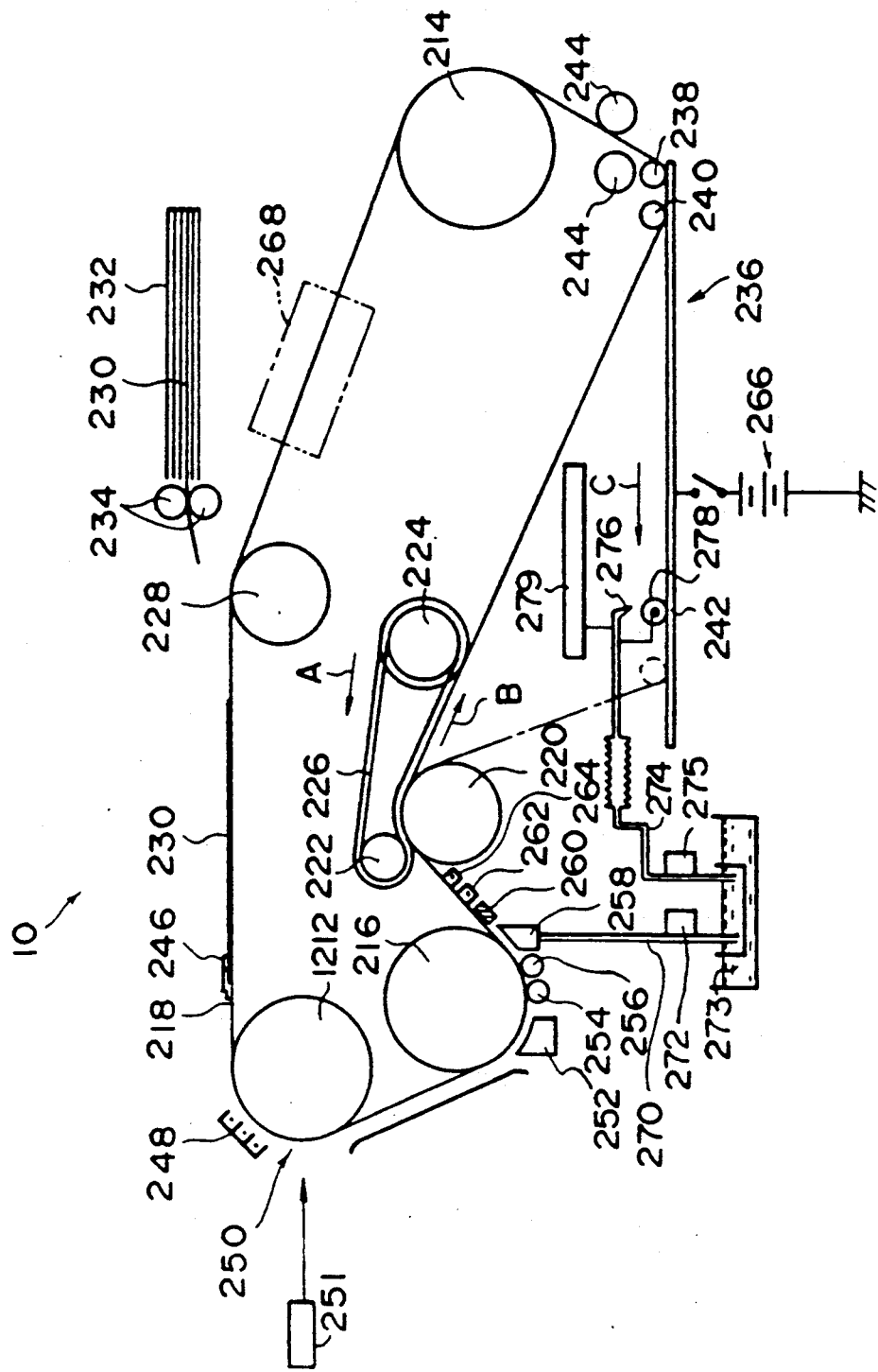
FIG. 5 is a cross-sectional view which illustrates an essential portion of a fourth embodiment of the present invention.

FIG. 5 illustrates a fourth embodiment of the liquid electrophotography apparatus 10 according to the present invention. This embodiment is suitably employed in a case where a hard material such as an aluminum plate is used as the photoconductive material.

The liquid electrophotography apparatus 10 according to this embodiment has suction drums 212 and 214 and a process drum 216 disposed between the suction drums 212 and 214. An endless belt 218 is arranged among the suction drums 212, 214 and the process drum 216.

Adjacent to the process drum 216 is a conveying drum 220 which is disposed in such a manner as to be in contact with the outside of conveying endless belt 218. An intermediate portion of the suction belt 226 wound round the rollers 222 and 224 is positioned in contact with the conveying drum 220.

The rollers 222 and 224 are rotated by a rotating force transmitted from a rotating means (omitted from illustration) so that the suction belt 226 is rotated in a direction designated by an arrow A. As a result of the rotation of the suction belt 226, the endless conveying belt 218 is rotated in a direction designated by an arrow B.

Figure 6:
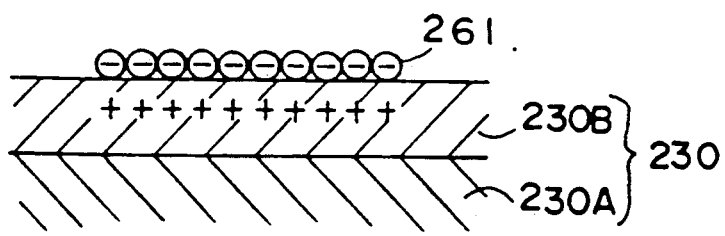
FIG. 6A is a cross-sectional view which illustrates a state in which toner is adhered to a photo-sensitive layer after being electrically charged and the photoconductive layer has been exposed to light.
FIG. 6B is a cross sectional view which illustrates a state in which there is an electrical charge before the transference.
FIG. 6C is a cross-sectional view which illustrates a state in which the photo-sensitive layer has been exposed to light before the transference.
FIG. 6D is a cross-sectional view which illustrates a case in which there is an electrical charge before the transference and an image is transferred without being subjected to an exposure.
Figure 6:
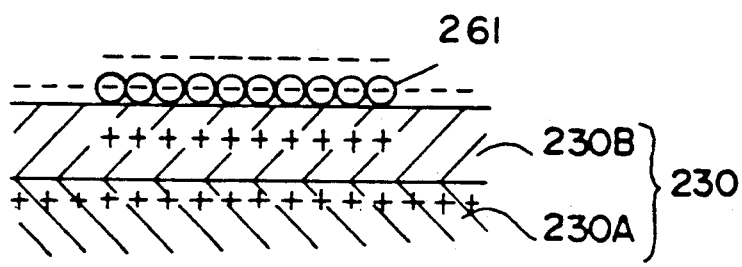
Figure 6:
Figure 6:
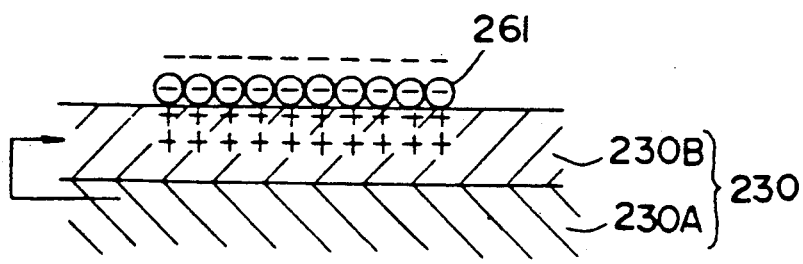
Figure 6:
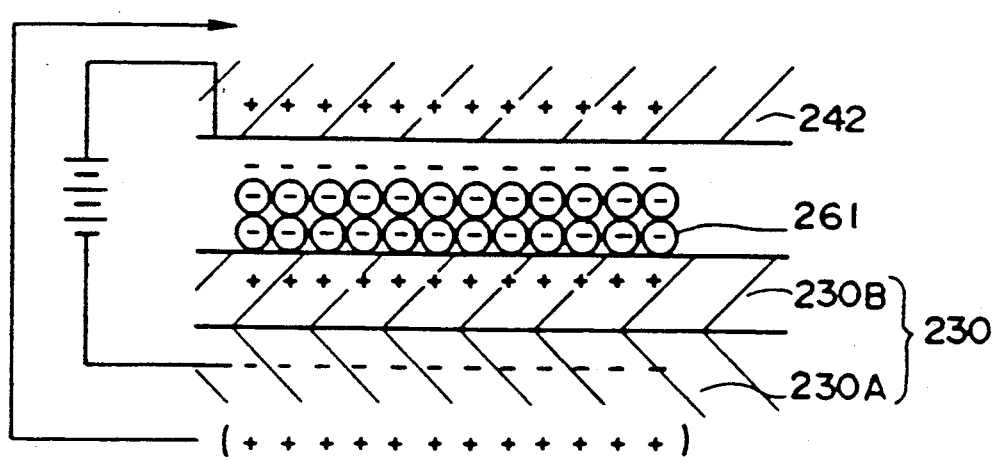

A guide roller 228 is positioned to be in contact with the inner side of the endless conveying belt 218 and disposed above the suction belt 226. A magazine 232 accommodating a photoconductive body 230 in the form of a sheet is positioned above the guide roller 228. A pair of conveying rollers 234 is positioned adjacent to the exit of the photoconductive body 230 in the magazine 232. The pair of conveying rollers 234 pulls out the photoconductive body 230 from the magazine 232 and conveys it onto the endless conveying belt 218. The photoconductive body 230 is, as shown in FIG. 6, formed of conductive layers 230A and 230B and a support member (omitted from illustration) disposed beneath the conductive layer 230A.

A transferring portion 236 is positioned beneath the suction drum 214. A retaining roller 238 and a transferring roller 240 are positioned on the inside of the endless conveying belt 218. An aluminum plate 242 is positioned below the transferring roller 240.

A pair of guide rollers 244 is positioned between the retaining roller 238 and the suction roller 214. The endless conveying belt 218 is arranged between the guide rollers 244.

The endless conveying belt 218 has photoconductive body holders 246 for holding the sheet-shaped photoconductive body 230 pulled out from the magazine 232. The photoconductive body holders 246 are positioned on both sides of the photoconductive body 230 so as to hold the photoconductive body 246 onto the endless conveying belt 218.

A charger 248 is positioned diagonally above the suction drum 212. The suction drum 212 has an image exposure position 250 down stream from the charger 248 in the conveying direction of the endless conveying belt 218. The image exposure position 250 is applied with light corresponding to the image from a laser 251.

The photoconductive body 230 on which the static latent image has been formed is conveyed to the process drum 216. The process drum 216 has a developing device 252 in which liquid developer is circulated. The liquid developer contains toner particles of reversed polarity to the charge of the static latent image. The reversed polarity toner particles are supplied to the surface of the photoconductive member 230 on which the static latent image has been formed. As a result, the toner particles are adhered to the static latent image so that the static latent image is made apparent and developed as shown in FIG. 6A.

Squeeze rollers 254 and 256 are positioned downstream from the developing device 252 in the direction of the conveying of the endless conveying belt 218.

A rinse device 258 is positioned down stream from the squeeze roller 256 in the direction of the conveyance of the endless conveying belt 218. The rinse device 258 supplies the rinse liquid to the surface of the photoconductive body 230 so as to wash off excess toner particles.

The rinse device 258 is connected to a rinse liquid supply portion 273 via a pipe 270 and a pump 272. When the pump 272 is operated, rinse liquid in the rinse liquid supply portion 273 is exuded through the pipe 270. A pipe 274 and a pump 273 are connected to the rinse liquid supply portion 273. The pipe 274 extends to an end portion of the aluminum plate 242 opposite the position at which the retaining roller 238 is positioned. The pipe 238 has a nozzle 276 at the front end portion thereof. As a result, the rinse liquid exudated from the rinse liquid supply portion 273 jets out from the nozzle 276. An application roller 278 is positioned in the jetting direction from the nozzle 276. The application roller 278 is arranged to move horizontally together with the nozzle 276.

The application roller 278 and the nozzle 276 are supported by horizontal a operating means 279. The operating means 279 is arranged to reciprocate the nozzle 276 and the application roller 278 in the horizontal direction along the surface of the aluminum plate 242 when viewed in FIG. 5. At the above-described reciprocating motion, the surface of the application roller 278 is in contact with the surface of the aluminum plate 242. As a result, the surface of the aluminum plate 242 is applied with the rinse liquid. The above-described rinse liquid application operation is arranged to be conducted in synchronization with the movement of the transferring roller 240 so that the application roller 278 does not interfere with the transferring roller 240.

A drying device 260 is positioned downstream from the rinse device 258. The drying device 260 is supplied with heated air from a dry air supply means (omitted from illustration), and applies dry air to the surface of the photoconductive body 230. As a result, the photoconductive body 230 which has been wetted by the rinse device 258 is dried.

A precharger 262 is positioned downstream from the drying device 260. The precharger 262 charges the toner image which are adhered to the surface of the photoconductive body 230 on which the toner image (for example, an image formed by toner particles 261 which has been positively charged as shown in FIG. 6) has been formed so as to make the polarity of the toner image the same as the toner particles (state shown in FIG. 6B).

A pre-exposure device 264 is positioned downstream from the precharger 262. The pre-exposure device 264 applies light to the toner image on the charged photoconductive body 230 so as to shift the charge (the positive charge as shown in FIG. 6B) present in the conductive layer 230A of the photoconductive body 230 to a position adjacent to the toner particles in the photoconductive layer 230B of the photoconductive body 23. Furthermore, the charge in the non-image formed portion is neutralized. As a result, a static adsorption force acting between the toner particles 261 and the photoconductive body 230 is strengthened. Therefore, unnecessary shift of the toner particles to the aluminum plate 242 while the transferring voltage has not been raised sufficiently, can be prevented. As a result, the toner particles can be reliably transferred to the aluminum plate 242 due to the application of high level transferring voltage.

It is preferable that the pre-exposure device 264 be arranged to apply light from the reverse side of the photoconductive body 230 in the case where the photoconductive body 230 is made of a transparent material.

The transferring portion 236 has a frame (omitted from illustration) on which the aluminum plate 242 is placed. When the transferring roller 240 is rotated and shifted in a direction designated by an arrow C and the endless conveying belt 218 is thereby brought into hermetic contact with the aluminum plate 242, the photoconductive body 230 on which the toner image has been formed is brought into hermetic contact with the aluminum plate 242.

The aluminum plate 242 is connected to a power source 266 and is thereby applied with voltage.

A cleaning portion 268 is formed between the guide roller 228 and the suction drum 214 so as to clean up the photoconductive body 230 whose toner image has been transferred to the aluminum plate 242.

According to this embodiment, a developer for a static charged image disclosed in Japanese Patent Application No. 63-41272 and Japanese Patent Application No. 63-41273 and characterized in that at least a copolymer expressed by the following general formula (I) and (II) is contained in its carrier liquid:

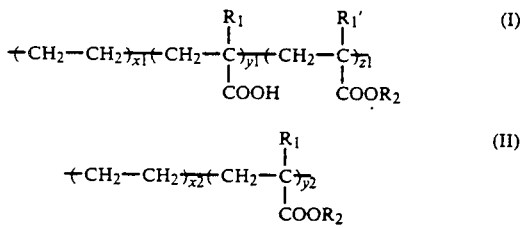

were symbol R1 represents hydrogen atoms or a methyl group and R2 represents an alkyl group, an aralkyl group, an aryl group or a cycloalkyl group, x1, y1 and z1 represent the molar number and x1:y1:z1=0.99 to 0.80:0.005 to 0.195:0.195 to 0.005, x2 and y2 represent the molar number and x2:y2=0.995 to 0.80:0.005 to 0.2.

The above-described developer exhibits a significant transference efficiency, an excellent performance of aggregating the image in a dry condition. Thereby image disorder can be prevented satisfactorily, and static transference of on image can be conducted at the time of the image transference, causing high image quality transference to be conducted. Furthermore, the realized toner charge can be retained during sequential processing such as the drying operation on the photoconductive body conducted with the apparatus according to the present invention. Therefore, it is particularly suitable to be used in the transferring apparatus according to the present invention. When nonaqueous solvent is supplied at the time of the image transference, the transference performance can be further improved.

With the aluminum plate 242 (a form plate) used in this embodiment, all of aluminum substrates may be used as ordinary presensitizing plate (PS plate). It is preferable that an aluminum substrate whose surface has been subjected to a sand-like pattern treatment, so-called graining or anodic oxidation treatment, be employed.

Each part of this embodiment which has omitted detail explanation has the same construction and function with the corresponding part.

Now, the operation of this embodiment will be described.

A photoconductive body 230 accommodated in the magazine 232 is pulled out by a pair of conveying rollers 234 and placed on the endless conveying belt 218. Next, both end portions of the front portion of the photoconductive body 230 is retained to the endless conveying belt 218 by the photoconductive body holders 246.

The endless conveying belt 218 holding the photoconductive body 230 is conveyed by the suction belt 226 so that the photoconductive body 230 is wound round the suction drum 212. The surface of the photoconductive body 230 wound round the suction drum 212 is, for example, positively charged as shown in FIG. 6. According to this embodiment, voltage of 200 V to 800 V, preferably 300 V to 600 V is applied to the surface of the photoconductive body 230, and the uniformity is ±10% or less, preferably ±5% or less, and further preferable ±1% or less.

The photoconductive body 230 whose surface has been positively charged is further conveyed by the endless conveying belt 218 until a laser beam is applied thereto at the image exposure position 250. The laser beam corresponding to the image is applied to the surface of the photoconductive body 230. The portion of the photoconductive body 230 applied with the laser beam becomes conductive, causing the charge on the surface to be eliminated. Therefore, a static latent image is formed by the residual charge.

The photoconductive body 230 on which the static latent image has been formed is conveyed by the endless conveying belt 218 until it faces the developing device 252 of the process drum 216 so as to be supplied with liquid developer. As a result, the toner particles which have been negatively charged are neutralized with the charge forming the static latent image so as to adhere to the photoconductive body 230. Therefore, the static latent image is made a developed image which is ten further developed so as to become a toner image (see FIG. 6A). The quantity of the toner particles adhered to the photoconductive body 230 by the developing device 252 so as to correspond to the static latent image is 0.1 mg/cm² to 0.3 mg/cm², preferably 0.2 mg/cm² to 0.25 mg/cm² at the image portion having maximum dencity (D max).

The photoconductive body 230 on which the toner image has been formed is subjected to a process in which the excess toner particles which are adhered to the surface is removed by the squeeze rollers 254 and 256. Furthermore, rinse liquid is supplied to the surface of the photoconductive body 230 so as to remove the excess toner particles.

The surface of the photoconductive body 230 from which excess toner particles have been removed by the rinse device 258 but wetted by the rinse liquid is dried by the drying device 260.

The surface of the photoconductive layer 230B of the photoconductive body 230 which has been dried by the drying device 260 is charged so as to have the same polarity as that of the toner particles, that is, charged negatively by the precharger 262. The positive charge corresponding to the negative polarity of the surface of the photoconductive layer 230B is generated in the conductive layer 230A.

The surface potential charged on the image carrier by the precharging process is arranged to be substantially the same potential as the charged potential and the polarity is arranged to be the same as that of the toner particles. That is, the reversed polarity as that of the charging in the case where the positive development is performed. According to this embodiment, the potential is arranged to be −300 V to −600 V.

Light is applied to the photoconductive body 230 charged by the precharger 22 by the pre-exposure device 264. As a result, the positive charge of the conductive layer 230A of the photoconductive body 230, that is, the charge corresponding to the charge of the toner particles charged by the precharger 262 is shifted to the position in the vicinity of the toner particles of the photoconductive layer 20B as shown in FIG. 6C. As a result, the charge retained on the non-image portion is neutralized. Therefore, the static adsorption force acting between the toner image and the photoconductive body 230 is strengthened. Therefore, the easy shift of the toner particles to the aluminum plate 242 by small transferring voltage can be prevented. The toner particles can therefore be reliably transferred to the aluminum plate 242 by a transferring voltage exceeding a predetermined voltage.

The quantity of light used at the time of the pre-exposure process may be the same as that used at the time of the exposure process. According to this embodiment, a halogen lamp of 36 V 300 W is employed so as to apply a light of 1000 luxsec.

It is preferable that the pre-exposure light be applied to the reverse side of the photoconductive body 230. However, even if it is applied to the exterior side, the disorder of the image can be prevented in the full black portion, that is, the portion to which the toner particles of a large quantity is adhered since aggregating force is sufficient. The adhering force can be weakened in the portion to which the small quantity toner particles are adhered or a portion in which a thin line image is formed by employing the most suitable transferring conditions. As a result, excellent image transference can be performed which has the same effect when exposed to the reverse side.

The application roller 278 to which the rinse liquid jets through the nozzle 276 by the pump 275 of the nonaqueous solvent application mechanism is reciprocated once toward the aluminum plate 242 so that nonaqueous solvent of a thickness of 10 to 100 $\mu$m is uniformly applied on the aluminum plate 242.

The photoconductive body 230 which has been pre-exposed is further conveyed until it is developed on the aluminum plate 242 by the transferring roller 240. At this time, the transferring roller 240 softly presses the photoconductive body 230 with a pressure of 0.5 kg/cm$^2$ to 1.5 kg/cm$^2$ to the aluminum plate 242. Since the aluminum plate 242 has been charged positively due to the application of the positive voltage, the toner particles on the photoconductive body 230 is adsorbed by the above-described positive charge, causing the toner image on the photoconductive body 230 to shift onto the aluminum plate 242. According to this embodiment, the above-described voltage supplied from the voltage source 266 to the aluminum plate 242 is from 300 V to 350 V.

In the above-described transference process, since the photoconductive member 230 on which the toner image has been formed is charged to the same polarity as that of the toner particles and is also subjected to pre-exposure, the toner particles cannot be separated prior to the adhesion to the aluminum plate 242 of the photoconductive body 230. Therefore, the image disorder can be prevented, causing an excellent transferred image to be obtained.

According to this embodiment, the pump 275 and the application roller 278 are used to apply the rinse liquid to the aluminum plate 242 and the application is conducted after the aluminum plate 242 has been shifted to a predetermined position (the position shown in FIG. 5). The application process may be arranged to be conducted at or before the shift to the predetermined position.

FIG. 6D illustrates a cause in which the transference is conducted in such a manner that the charging is conducted by the charger 262 and no pre-exposure is conducted. In this case, since the positive charge of the conductive layer 230A is shifted to the aluminum plate 242, the tone particles are irregularly adsorbed by the aluminum plate 242 by a small transferring voltage. Therefore, transference of a precise image cannot be conducted. Although the invention has been described in its preferred form with a certain degree of particularly, it is understood that the present disclosure of the preferred from has been changed in the details of construction and the combination and arrangement of parts may be resorted to without departing from the spirit and the scope of the invention as hereinafter claimed.

What is claimed is:

1. A liquid electrophotographic transferring apparatus for forming an image on a transferring body by using a liquid developer in which toner is retained in carrier liquid comprising:

an image support member to which toner particles in said liquid developer are adhered by an electrostatic force in accordance with an image to be formed;

drying means for drying said toner particles on said image support member so as to bring them into an aggregated state, wherein said drying is continued until a quantity of said carrier liquid remaining on said image support member per 1 mg of said toner particles becomes 20 mg or less;

transferring means for transferring a toner image onto said transferring body by an electrostatic force after said drying operation so that an image formed by aggregated toner particles is assuredly transferred to said transferring body; and means for supplying insulating liquid to said toner particles on said image support member before said image support member is brought into hermetic contact with said transferring body thereby said image is transferred.

2. A liquid electrophotographic transferring apparatus according to claim 1, wherein said drying is performed by applying air onto said image support member.

3. A liquid electrophotographic transferring apparatus according to claim 1, wherein said image support member comprises a photoconductive material, a portion of which is exposed to light after being charged by a charger so that a portion of said photoconductive material which has been exposed to light has conductivity, and said toner particles in said developer are electrostatically absorbed by a residual charge in non-exposed portion so that development is performed and unnecessary toner particles can be washed off by a rinse liquid supplied after said development.

4. A liquid electrophotographic transferring apparatus according to claim 3, wherein said image support member comprises a photoconductive drum arranged in such a manner that a photoconductive layer is fastened to an outer surface of a conductive layer and said charger, said exposing portion, developing portion, drying portion and transferring portion being positioned to correspond to said outer surface of said photoconductive drum.

5. A liquid electrophotographic transferring apparatus according to claim 3, wherein said image support member comprises an endless belt arranged in such a manner that a photoconductive layer is fastened to an outer surface of a conductive layer and said charger, said exposing portion, developing portion, drying portion and transferring portion being positioned to correspond to said outer surface of said photoconductive drum.

6. A liquid electrophotographic transferring apparatus according to claim 3, wherein said rinse liquid is supplied to said toner on said image support member before said image support member is brought into hermetic contact with said transferring body, said image is thereby transferred so that transferring performance is improved.

7. A liquid electrophotographic transferring apparatus according to claim 1 further comprising a charger for applying a voltage having a reverse polarity of charge of said toner particles on said image support member after said liquid developer of said image support member has been dried so that an electrostatic retaining force between said toner and said image support member is weakened.

8. A liquid electrophotographic transferring apparatus according to claim 1, wherein said liquid supply means supplies a rinse liquid.

9. A liquid electrophotographic transferring apparatus according to claim 1, wherein at least either said image support member or said transferring body is comprised of a soft material so as to be brought into hermetic contact with each other due to applied pressure.

10. A liquid electrophotographic transferring apparatus according to claim 1 further comprising: a charger for applying voltage, having a polarity the same as that of said toner particles, to the surface of said image support member including said toner particles after said developer of said image support member has been dried, and exposing means for exposing a photoconductive layer of said image support member to bring it into a conductive state.

11. A liquid electrophotographic transferring apparatus according to claim 1, wherein said drying means evaporates liquid from said toner particles.

12. A liquid electrophotographic transferring apparatus for forming an image on a transferring material by using a liquid developer in which toner is retained in carrier liquid comprising:

an image support member to which toner particles in said liquid developer are adhered by an electrostatic force in accordance with an image to be formed;
drying means for drying said toner particles on said image support member so as to bring them into an aggregated state, wherein said drying is continued until a quantity of said carrier liquid remaining on said image support member per 1 mg of said toner particles becomes 20 mg or less;
liquid supply means for supplying liquid onto said image support member containing said toner particles which have been dried so that a toner image is easily separated from said image support body; and
transferring means for brining said image support member to which said liquid has been supplied into hermetic contact with said transferring material so that said toner image is transferred onto said transferring material due to an electrostatic force.

13. A liquid electrophotographic transferring apparatus according to claim 12 further comprising a charger for applying reversed polarity voltage to a charge of said toner particles formed by said toner particles on said image support member after said developer of said image support member has been dried so that a electrostatic retaining force between said toner and said image support member is weakened.

14. A liquid electrophotographic transferring apparatus according to claim 12, wherein a rinse liquid is supplied onto said image support member after said development.

15. A liquid electrophotographic transferring apparatus according to claim 14 further comprising means for supplying said rinse liquid to said image support member which has been dried, but said image of which has yet to be transferred.

16. A liquid electrophotographic transferring apparatus according to claim 12, wherein at least either said image support member or said transferring material is comprised of a soft material so as to be brought into hermetic contact with each other due to applied pressure.

17. A liquid electrophotographic transferring apparatus according to claim 12, wherein said drying means evaporates liquid from said toner particles.

18. A liquid electrophotographic transferring apparatus for forming an image on a transferring material by using a liquid developer in which toner is retained in carrier liquid comprising:

an image support member to which toner particles in said liquid developer are adhered by an electrostatic force in accordance with an image to be formed;
drying means for drying said toner particles on said image support member so as to bring them into an aggregated state, wherein said drying is continued until a quantity of said carrier liquid remaining on said image support member per 1 mg of said toner particles becomes 20 mg or less;
means for applying a voltage having a reverse polarity of a charge of said toner particles on said image support member which has been dried;
transferring means for transferring a toner image to said transferring material by an electrostatic force after said voltage has been applied; and
means for supplying insulating liquid to said image support member to which said voltage of said reverse polarity has been applied.

19. A liquid electrophotographic transferring apparatus according to claim 18, wherein said liquid supply means supplies rinse liquid.

20. A liquid electrophotographic transferring apparatus according to claim 18, wherein said drying means evaporates liquid from said toner particles.

21. A liquid electrophotographic transferring apparatus for forming an image on a transferring material by using a liquid developer in which toner is retained in carrier liquid comprising:

an image support member to which toner particles in said liquid developer are adhered by an electrostatic force in accordance with an image to be formed;

drying means for drying said toner particles on said image support member so as to bring them into an aggregated state, wherein said drying is continued until a quantity of said carrier liquid remaining on said image support member per 1 mg of said toner particles becomes 20 mg or less;

means for applying voltage of the same polarity as a charge of said toner particles on said image support member which has been dried;

means for bringing said image support member to a conductive state after said voltage has been applied;

transferring means for transferring an image to said transferring material by an electrostatic adsorption force by bringing said image support member into hermetic contact with said transferring material after said image support member has been brought into said conductive state; and means for supplying liquid to said image support member after said development.

22. A liquid electrophotographic transferring apparatus according to claim 21, wherein at least either said image support member or said transferring material is comprised of a soft material so as to be brought into hermetic contact 23. A liquid electrophotographic transferring apparatus according to claim 21, wherein said drying means evaporates liquid from said toner particles.

* * * * *